US012437607B2

(12) United States Patent
Piorno

(10) Patent No.: US 12,437,607 B2
(45) **Date of Patent: *Oct. 7, 2025**

(54) REMOTE PLAYING CARD GAME

(71) Applicant: Fabian Piorno, Plantation, FL (US)

(72) Inventor: Fabian Piorno, Plantation, FL (US)

(*) Notice: Subject to any disclaimer, the term of this patent is extended or adjusted under 35 U.S.C. 154(b) by 314 days.

This patent is subject to a terminal disclaimer.

(21) Appl. No.: 18/075,178

(22) Filed: Dec. 5, 2022

(65) Prior Publication Data

US 2023/0096211 A1 Mar. 30, 2023

Related U.S. Application Data

(63) Continuation-in-part of application No. 17/544,912, filed on Dec. 7, 2021, now Pat. No. 11,521,467.

(60) Provisional application No. 63/122,256, filed on Dec. 7, 2020.

(51) Int. Cl.
*G07F 17/32* (2006.01)

(52) U.S. Cl.
CPC ...... *G07F 17/3223* (2013.01); *G07F 17/3211* (2013.01); *G07F 17/3276* (2013.01); *G07F 17/3293* (2013.01)

(58) Field of Classification Search
CPC ............. G07F 17/3223; G07F 17/3211; G07F 17/3276; G07F 17/3293
USPC ............................................... 463/13, 12, 11
See application file for complete search history.

(56) References Cited

U.S. PATENT DOCUMENTS

| | | | | |
|---|---|---|---|---|
| 10,964,171 | B1 * | 3/2021 | Brett | G07F 17/3262 |
| 11,094,173 | B1 * | 8/2021 | Espino | G07F 17/3244 |
| 11,127,263 | B1 * | 9/2021 | Isso | G07F 17/3223 |
| 11,170,606 | B1 * | 11/2021 | Chau | G07F 17/3241 |
| 2008/0197572 | A1 * | 8/2008 | Feola | A63F 3/00157 273/292 |
| 2016/0321870 | A1 * | 11/2016 | Alderucci | G07F 17/3211 |
| 2017/0103616 | A1 * | 4/2017 | Amaitis | G07F 17/3293 |
| 2020/0388101 | A1 * | 12/2020 | Snow | A63F 1/14 |
| 2021/0304550 | A1 * | 9/2021 | Kelly | G06T 15/20 |
| 2023/0230439 | A1 * | 7/2023 | Lyons | G07F 17/322 463/11 |

* cited by examiner

*Primary Examiner* — Pierre E Elisca
(74) *Attorney, Agent, or Firm* — Mark C. Johnson; Johnson | Dalal

(57) ABSTRACT

A method of playing a remote playing card game that includes a specialized physical game table communicatively coupled and/or physically coupled to a plurality of electronic communication devices remotely displaced from the game table and dealing physical playing cards on the physical game table, wherein a camera on the physical game table is operably configured to communicate the suit and rank of the dealt playing cards, the physical shuffling of the cards, and the game layout on the game table, to the electronic communication devices for the remote users for game play.

17 Claims, 11 Drawing Sheets

100

100

REMOTE PLAYING CARD GAME

FIELD OF THE INVENTION

The present invention relates generally to playing card games and, more particularly, relates to methods, systems, and devices enabling remote play of said playing card games.

BACKGROUND OF THE INVENTION

Playing-card games, particularly those related to gambling, are very popular and highly participated in by many users through the world. Providing security and safety for those gaming users, is particularly more prevalent in light of the pandemic. To that end, many games are being designed for remote game play, i.e., where one or more of the gaming users are located in different physical locations. There are some games designed for remote play that enable and provide remote communication and display of the game to those remote gaming users. However, many users still have distrust for said remote games, e.g., how and when said playing cards (that are represented in digital form) are shuffled and delt (as they are typically done in brick and mortar casinos).

Specifically, many gaming users have very little trust as to how digital cards are brought about, nor are many users confident in the mathematical algorithms that have been created to shuffle or randomize the digital cards. As such, many gaming users desire to have confidence and safety in remote playing card game play that would make them feel as if they were sitting at a real-life gaming establishment, while many administrators of those games desire to maintain and expand game play among their gaming users.

One known method of conducting a remote playing card game includes having a live video game feed of a live dealer dealing cards on a physical card surface and those cards being displayed on a remotely located electronic display. This method has a number of disadvantages, however. For example, these methods do not allow a gaming establishment to easily change the type of game played by the remote users and generally do not allow or efficiently permit multiple players to play against each other during game play.

Therefore, a need exists to overcome the problems with the prior art as discussed above.

SUMMARY OF THE INVENTION

The invention provides a remote playing card game that overcomes the hereinafore-mentioned disadvantages of the heretofore-known devices and methods of this general type and that enables remote or remote-like game play of playing cards in an efficient, efficient, and desired way.

With the foregoing and other objects in view, there is provided, in accordance with the invention, a method of playing a remote-like playing card game includes the steps of providing at least one deck of a plurality of physical playing cards having four suits each having varying ranks of physical playing cards associated therewith, providing a plurality of electronic communication devices of a plurality of users, the plurality of electronic communication devices each having an electronic display, providing a physical game table with a physical playing card surface, with a playing card shuffling assembly operably configured to randomize an order of the playing cards, with the plurality of electronic communication devices of the plurality of users coupled to the physical game table, and with at least one camera coupled thereto and with a lens oriented toward the physical playing card surface and a portion of the playing card shuffling assembly, communicatively coupling the at least one camera with the plurality of electronic communication devices over a communications network and initiating a playing card game having the plurality of users associated with a player position depicted on the physical playing card surface, dealing, after the initiating of the playing card game, a plurality of physical playing cards onto a game table layout on the physical playing card surface in accordance with a playing protocol associated with the initiated playing card game and with each player position having one of the physical playing cards proximal thereto, capturing video of the dealing of the plurality of physical playing cards onto the game table layout on the physical playing card surface with the at least one camera in real-time and communicating the captured video of the dealing of the plurality of physical playing cards onto the game table layout to the electronic display for each of the plurality of electronic communication devices of the plurality of users, and playing the playing card game initiated by the plurality of users in accordance with the playing protocol to determine at least one winner therefrom.

In accordance with a further feature of the present invention, the lens is oriented toward a portion of the playing card shuffling assembly.

In accordance with an additional feature of the present invention, the physical game table is communicatively couplable to a server with a processor and a memory over a communications network and communicatively couplable with the plurality of electronic communication devices of the plurality of users over the communications network.

In accordance with yet another feature, an embodiment of the present invention also includes providing an electronic display screen forming the physical playing card surface, the electronic display screen having a user interface depicting the player position for each of the plurality of users.

In accordance with a further feature, an embodiment of the present invention also includes providing a table screen forming an outer surface of the physical game table, the physical game table encapsulating the user interface and the playing card shuffling assembly.

In accordance with yet another feature, an embodiment of the present invention also includes providing the server that is operably configured to execute computer-readable instructions to digitally vary the game table layout on the user interface based on the playing card game initiated.

In accordance with an exemplary feature, an embodiment of the present invention also includes initiating the card game by the plurality of users, wherein the initiating of the playing card game by the plurality of users varies the game table layout on the user interface.

In accordance with yet another feature, an embodiment of the present invention also includes dealing the plurality of physical playing cards onto the game table layout on the physical playing card surface by a dealer, the final location for each of the dealt plurality of physical playing cards onto the game table layout guided by a laser light In accordance with a further feature, an embodiment of the present invention also includes capturing video of shuffling of the plurality of physical playing cards by the playing card shuffling assembly in real-time with the at least one camera in real-time and communicating the captured video of the shuffling of the plurality of physical play cards to the electronic display for each of the plurality of electronic communication devices for the plurality of users.

In accordance with an additional feature, an embodiment of the present invention also includes providing the at least one deck of the plurality of physical playing cards, each having at least one RFID tag coupled thereto and with a card identifier uniquely associated with one of the four suits and varying ranks and receiving, from the card identifier from an RFID reader, wherein each of the dealt plurality of physical playing cards onto the game table layout on the physical playing card surface and communicating the card identifier for each of the dealt plurality of physical playing cards onto the game layout on the physical playing card surface to the electronic display for each of the plurality of electronic communication devices for the plurality of users.

In accordance with yet another feature, an embodiment of the present invention also includes dealing, after initiating the playing card game, a second plurality of physical playing cards onto the game table layout on the physical playing card surface for a second initiation of the playing card game in accordance with the playing protocol associated with the initiated playing card game and with each player position having one of the second plurality of physical playing cards proximal thereto.

Also in accordance with the present invention, a method of playing a remote-like playing card game includes providing at least one deck of a plurality of physical playing cards having four suits each having varying ranks of physical playing cards associated therewith, providing a plurality of electronic communication devices of a plurality of users, the plurality of electronic communication devices each having an electronic display, providing a physical game table with a physical playing card surface, having the plurality of electronic communication devices coupled thereto, communicatively couplable to a server with a processor and a memory over a communications network, communicatively couplable with the plurality of electronic communication devices of the plurality of users over the communications network, with a playing card shuffling assembly operably configured to randomize an order of the playing cards, and with at least one camera coupled thereto and with a lens oriented toward the physical playing card surface and a portion of the playing card shuffling assembly, communicatively coupling the physical game table with the plurality of electronic communication devices and initiating a playing card game with the plurality of users having a player position depicted on the physical playing card surface for each of the plurality of users, dealing, after initiating the playing card game, a plurality of physical playing cards onto a game table layout on the physical playing card surface in accordance with a playing protocol associated with the initiated playing card game and with each player position having one of the physical playing cards proximal thereto, capturing video of the dealing of the plurality of physical playing cards onto the game table layout on the physical playing card surface and video of shuffling of the plurality of physical playing cards by the playing card shuffling assembly with the at least one camera in real-time and communicating the captured video of the dealing of the plurality of physical playing cards onto the display screen, the game table layout, and the captured video of the shuffling of the plurality of physical play cards to the electronic display for each of the plurality of electronic communication devices for the plurality of users, and playing the playing card game initiated by the plurality of users in accordance with the playing protocol to determine at least one winner therefrom.

In accordance with yet another feature, an embodiment of the present invention also includes providing an electronic display screen forming the physical playing card surface, wherein the electronic display screen has a user interface depicting the player position for each of the plurality of remote users.

In accordance with a further feature, an embodiment of the present invention also includes dealing the plurality of physical playing cards onto the game table layout on the physical playing card surface by a dealer, wherein the final location for each of the dealt plurality of physical playing cards onto the game table layout guided by a laser light.

In accordance with a further feature, an embodiment of the present invention also includes providing the at least one deck of the plurality of physical playing cards, wherein each has at least one RFID tag coupled thereto and with a card identifier uniquely associated with one of the four suits and varying ranks and receiving, from the card identifier from an RFID reader, each of the dealt plurality of physical playing cards onto the game table layout on the physical playing card surface and communicating the card identifier for each of the dealt plurality of physical playing cards onto the game layout on the physical playing card surface to the electronic display for each of the plurality of electronic communication devices for the plurality of remote users.

The invention is also directed toward a method of playing a remote playing card game that includes the steps of providing at least one deck of a plurality of physical playing cards having four suits each having varying ranks of physical playing cards associated therewith, providing a plurality of electronic communication devices of a plurality of remote users, the plurality of electronic communication devices each having an electronic display, providing a physical game table with a physical playing card surface, with a playing card shuffling assembly operably configured to randomize an order of the playing cards, and with at least one camera coupled thereto and with a lens oriented toward the physical playing card surface, communicatively coupling the at least one camera with the plurality of electronic communication devices and initiating a playing card game with the plurality of remote users and having the plurality of remote users associated with a player position depicted on the physical playing card surface, dealing, after the initiating of the playing card game, a plurality of physical playing cards onto a game table layout on the physical playing card surface in accordance with a playing protocol associated with the initiated playing card game and with each player position having one of the physical playing cards proximal thereto, capturing video of the dealing of the plurality of physical playing cards onto the game table layout on the physical playing card surface with the at least one camera in real-time and communicating the captured video of the dealing of the plurality of physical playing cards onto the game table layout to the electronic display for each of the plurality of electronic communication devices of the plurality of remote users, and playing the playing card game initiated by the plurality of remote users in accordance with the playing protocol to determine at least one winner therefrom.

Although the invention is illustrated and described herein as embodied in a remote or remote-like playing card game, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the game table, front a left end to a right end or, alternatively, in the direction of playing card movement on the game table. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION OF INVENTION

Online gambling is illegal in most of the United States, but it is slowly becoming more acceptable and legalized. By the end of 2021, approximately ten states will have legalized online gaming. Online gaming is a fairly untapped market sector within the gambling industry. Further, most casinos or other gaming establishments do not have an online presence, and the ones that do, have poorly built software applications, websites, and other means to effectuate game play. The present invention helps casinos and other gaming establishments build their individual and customized online gaming websites and software application by having an online platform that will be attractive to players and create a new revenue stream for casinos. The present invention also enables the user to create an online gaming platform that only uses real playing cards.

The invention described herein provides a remote playing card game that overcomes known disadvantages of those known devices and methods of this general type and that safely, effectively, and efficiently enables remote play of a playing card game. Although the invention is illustrated and described herein as embodied in a remote playing card game and method of play, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

Figure 1:
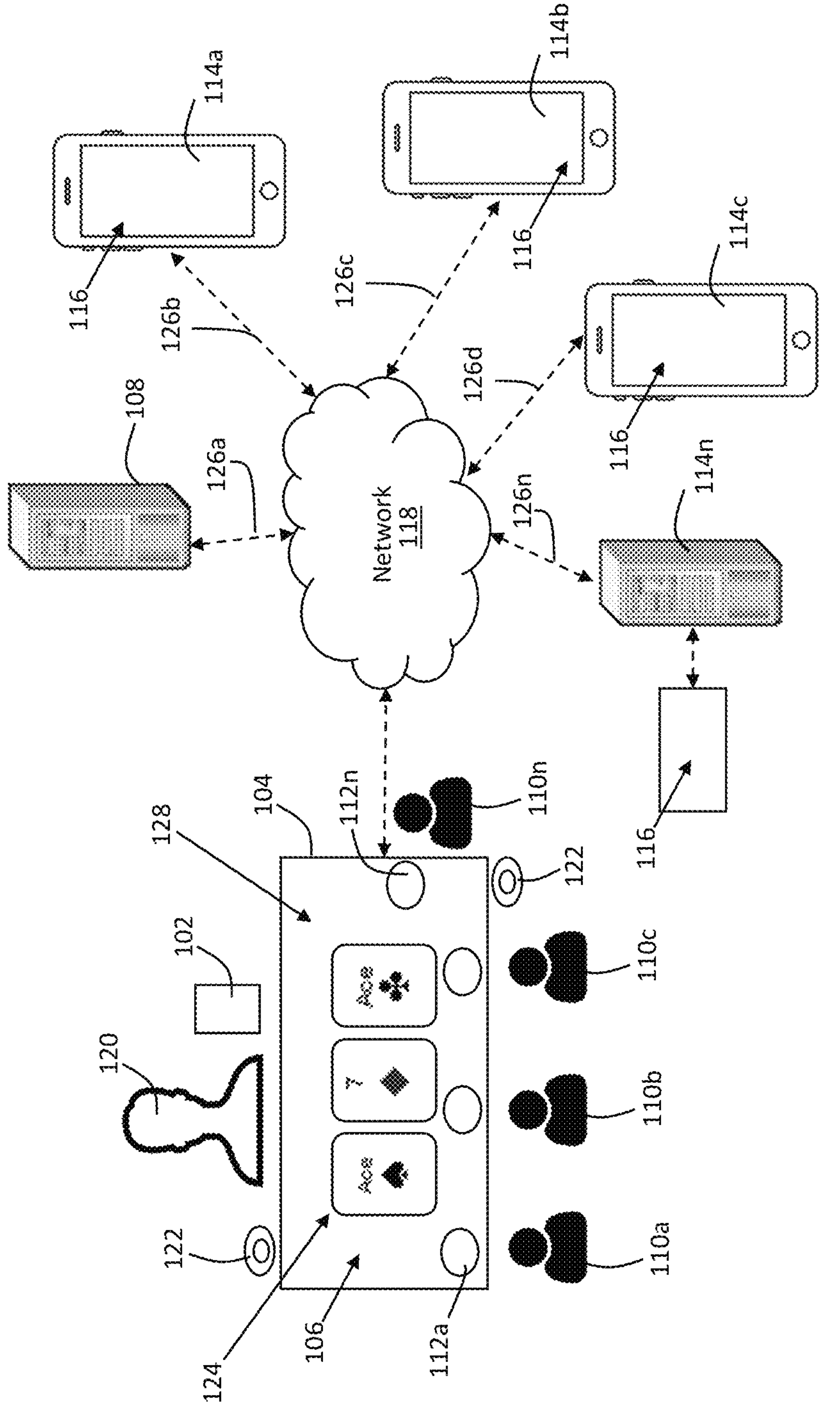
FIG. 1 is a block diagram view of an exemplary gaming network with multiple electrical communication devices with displays coupled thereto in accordance with an embodiment of the present invention.
Figure 2:
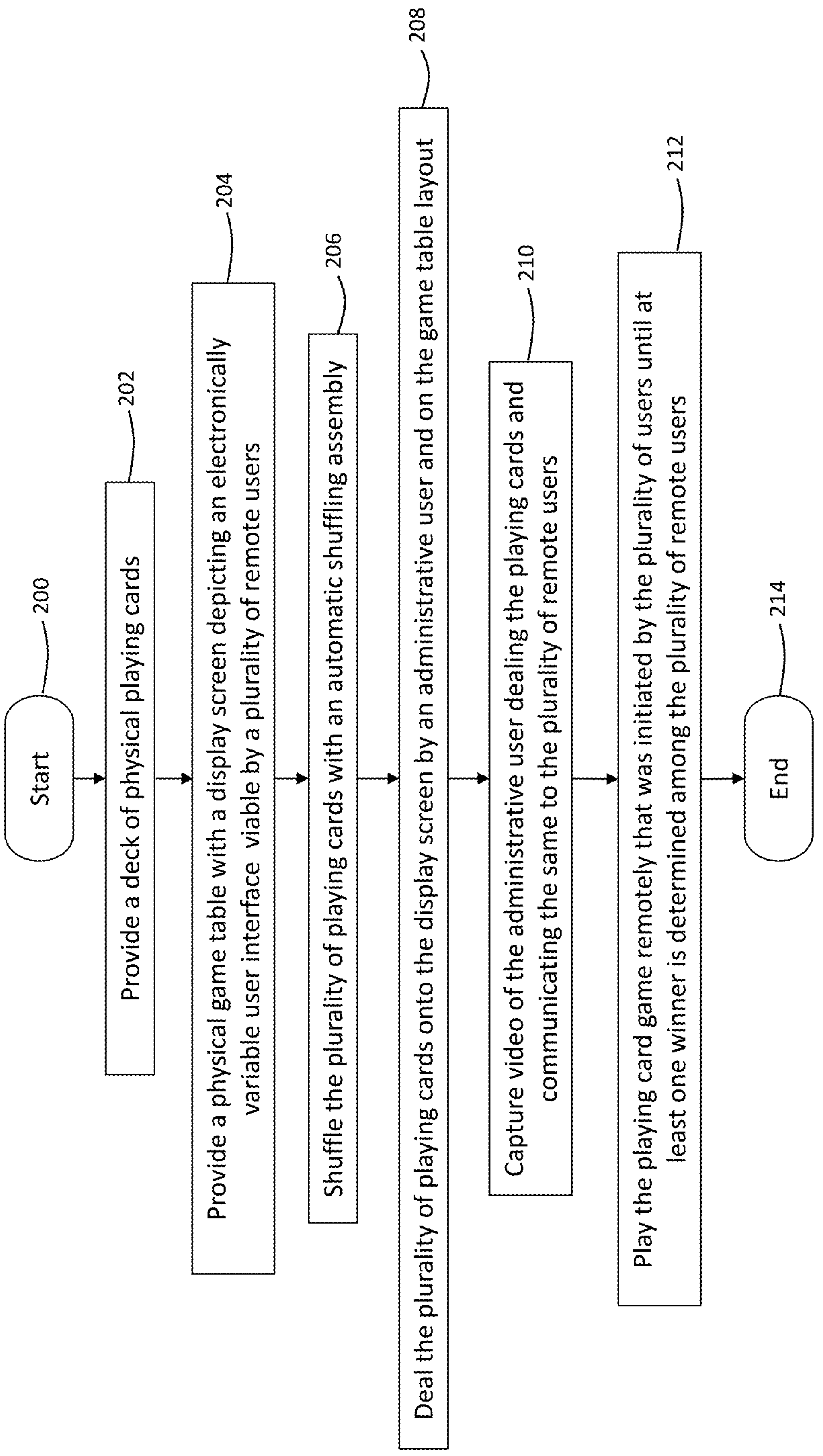
FIG. 2 is a process flow diagram depicting an exemplary method of playing a remote playing card game in accordance with an embodiment of the present invention.

Referring now to FIG. 1, one embodiment of the present invention is shown in a block diagram. FIG. 1 shows several advantageous features of the present invention, but, as will be described below, the invention can be provided in several shapes, sizes, combinations of features and components, and varying numbers and functions of the components. FIG. 1 will also be described in conjunction with the process flow chart of FIG. 2. Although FIG. 2 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 2 for the sake of brevity. In some embodiments, some or all of the process steps included in FIG. 2 can be combined into a single process.

Specifically, one exemplary method of playing a remote playing card game is depicted and described in FIGS. 1-2, respectively. The process begins at step 200 and immediately proceeds to step 202 of providing at least one deck of a plurality of physical playing cards 102 having four suits each having varying ranks of physical playing cards (e.g., cards 124) associated therewith. The term "deck of playing cards," without the modifier "representative," is defined as physical cards having four suits (e.g., spades, hearts, diamonds, clubs), with each of the four suits having playing cards associated therewith of a varying rank (e.g., 2, 3, 4, etc.). In most embodiments, the deck of playing cards includes at least 52 playing cards with each suit having 13 ranks associated therewith. In some embodiments, the playing cards may be representative (i.e., digital representations of the physical playing cards). In one embodiment, the deck(s) of the plurality of physical playing cards 102 may each have one or more RFID tag(s) coupled thereto or embedded therein, wherein the RFID tag(s) include a card identifier uniquely associated with one of the four suits and varying ranks. Said another way, the radio frequency tag may include a radio transponder, a radio receiver, and/or transmitter. When triggered by an electromagnetic interrogation pulse from a nearby RFID reader device, e.g., reader 1010, the tag(s) transmit digital data, usually an identifying inventory number, back to the reader. As discussed further herein, the RFID tag(s) enable the reader 1010 to receive the card identifier for each of dealt plurality of physical playing cards 102 onto the game table layout on the physical playing card surface 128, 1004 (see FIG. 10). Thereafter, the suit and rank are communicated to the electronic display 116 for each of the plurality of electronic communication devices 114*a*-*n* for the plurality of remote users 110*a*-*n*. Each of the playing cards 102 may also include a magnet embedded therein or coupled thereto to facilitate in the automatic shuffling and rotation of the cards 102 with, for example, a playing card shuffling assembly 1008, 404 (depicted in FIG. 4).

Figure 4:
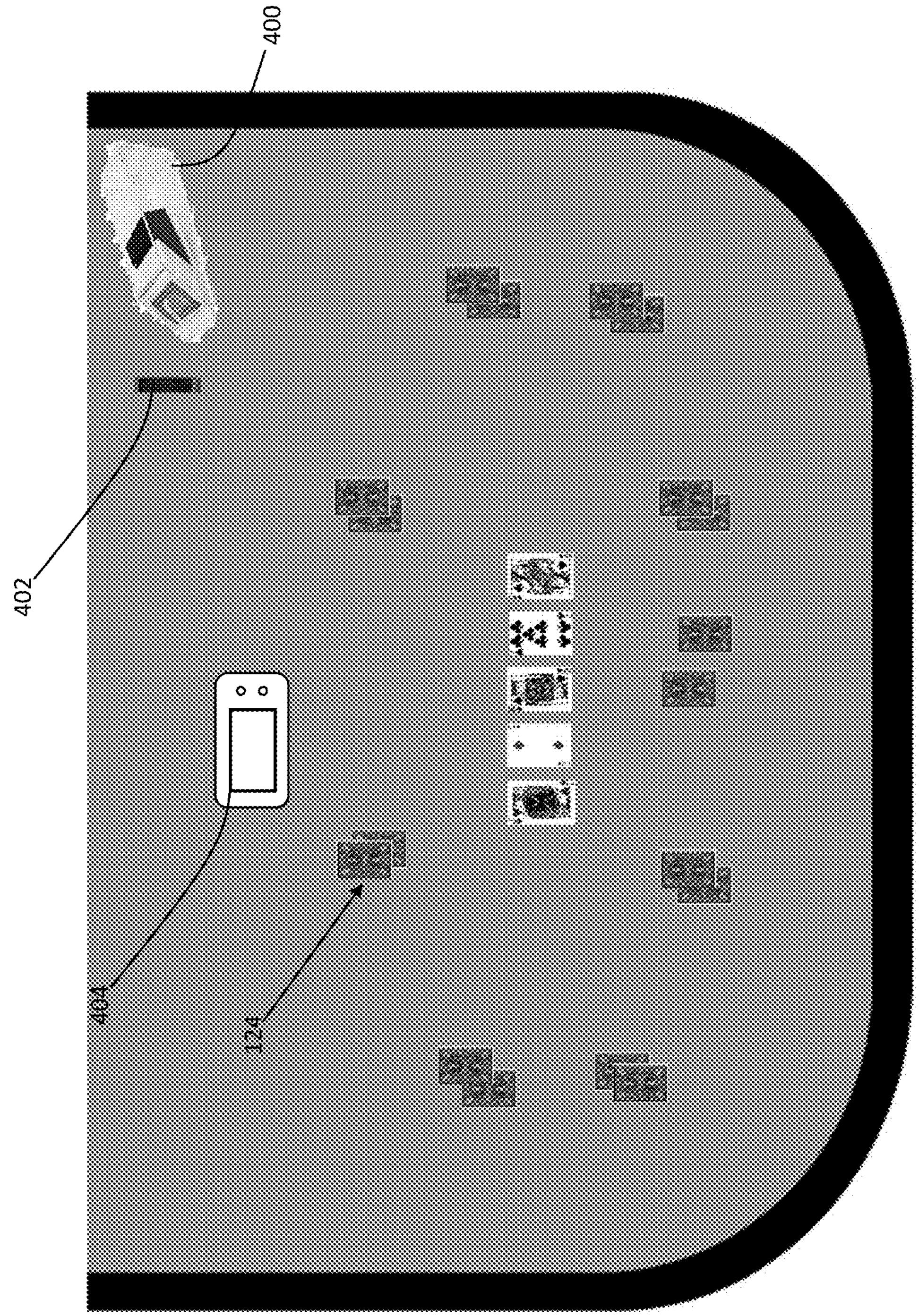
FIG. 4 depicts an illustration of the physical table with physical cards on the tabletop green screen implemented to carry out the method of playing the remote playing card game in accordance with one embodiment of the present invention.
Figure 10:
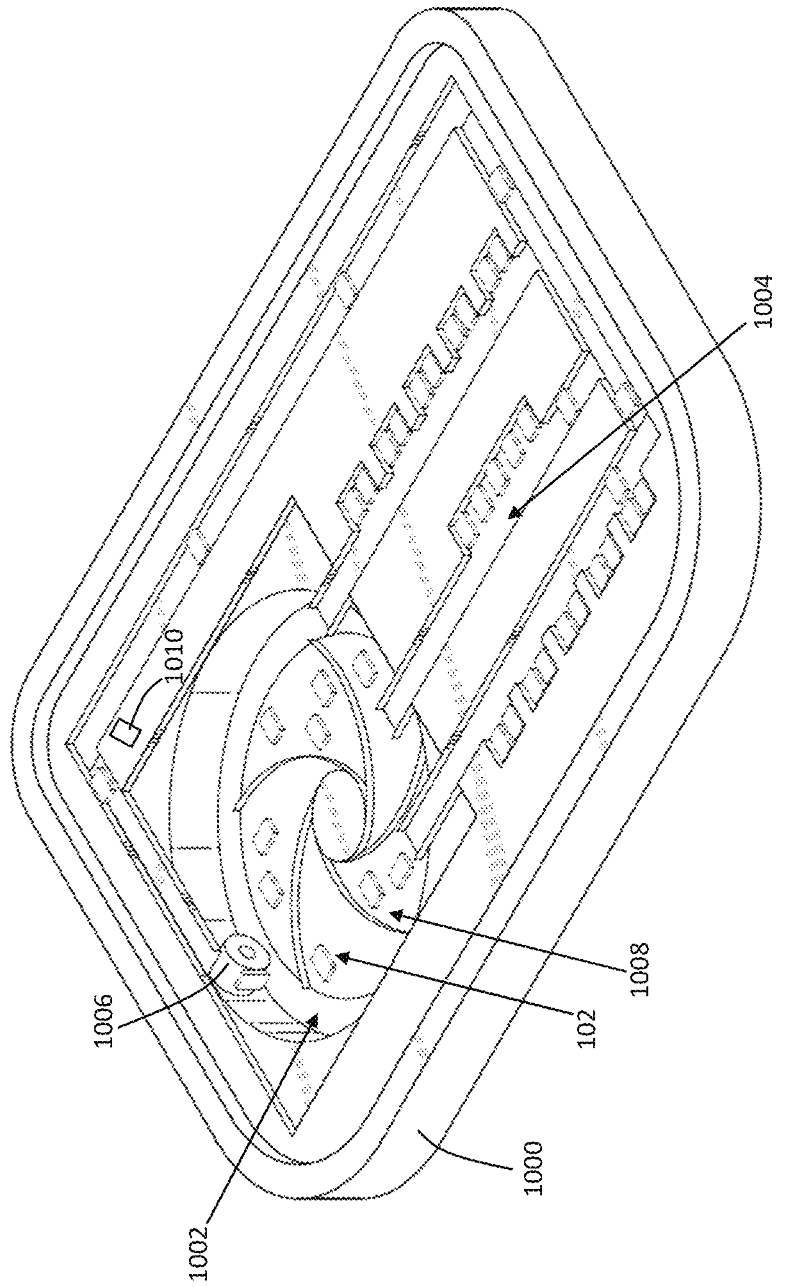
FIG. 10 depicts a partially sectional and fragmentary view with a top screen of the physical table removed to expose a shuffling assembly and a plurality of physical cards therein for game play by remote users.

Next, with reference to FIG. 1 and FIG. 10 in combination with FIG. 2, step 204 includes providing a physical game table 104 having a display screen 106 depicting a user interface and communicatively coupled to a server 108 with a processor and memory. In preferred embodiments, the server 108 is maintained and controlled by the operator of the gaming establishment or third-party and may store or otherwise have resident software configured to carryout the playing card games and/or store game/user information. The server is operably configured to execute computer-readable instructions to digitally vary a game table layout of the user interface based on a playing card game (e.g., blackjack, Texas hold'em, etc.) initiated by a plurality of remote users 110*a*-*n*. Therefore, the physical game table 104 is universal and may also utilize (in addition to the electronic user interface or instead of the electronic user interface) a green screen or surface as a table top, whereby video captured of the display screen 106 (and green screen) can be manipulated with a desired background (as known in the art). Therefore, the display screen 106 may be digital display, a display surface, and/or a projected display onto the table. As such, the display screen 106 is configured to permit the play of multiple different types of games on a single surface effectively, efficiently, and with remote users. The ability to easily change the display of the table will allow the gaming establishments to advertise. As best seen in FIG. 4, the screen 106 may also include an automatic playing card shuffling assembly 404, also known as an automatic card shuffler, that may or may not be captured by a camera facing the display.

Additionally, the software utilized by the present invention enables quick changing of the display screen, thereby allowing gaming establishments to advertise and profit from advertisement revenue. The software utilized by the present invention enables quick changing of the display screen that also facilitates in having gaming establish convert any table to a game layout user interface. Currently if a gaming establishment wants to change a cloth felt of a table to a display felt of a different game, it can take significant period of time. As such, the ability for gaming establishments to quickly change game formats on the digital green screen makes gaming establishments more efficient, and profitable. Said differently, the method may include providing a server 114*n* that is operably configured to execute computer-readable instructions to digitally vary the game table layout on the user interface based on the playing card game initiated. As such, a green screen tabletop design allows modification of the design (e.g., blackjack, poker, etc.), thereby providing a more efficient table, that takes up less space, and enables gaming administrator or establishment to scale up effectively and efficiently based on demand, ultimately providing more profit to the gaming establishment. Additionally, this also enables advertising opportunities for the gaming table. Further, the method may include initiating the card game by the plurality of remote users 110*a*-*n*, wherein the initiating of the playing card game by the plurality of remote users 110*a*-*n* varies the game table layout on the user interface. In one embodiment, the software application resident on or accessible by the electronic communication device (e.g., phone) enables generation of one or more graphical user interface icons on the electronic display 116 for selection or manipulation by the remote users 110*a*-*n* that not only dictate the type of game, but also initiate the game played by the user(s) 110*a*-*n*.

Said another way and with reference to FIG. 1 and FIG. 10, the method may include providing an electronic display screen 106 forming the physical playing card surface 128, 1004, wherein the electronic display screen 106 has a user interface depicting the player position for each of the plurality of remote users 110*a*-*n*. Thereafter, the cards 102 may be dealt onto the user interface (manually by the dealer or automatically with a device, such as the shuffling assembly 1008. In one embodiment, the physical game table 1000 may include table screen 1100 forming an outer surface of the physical game table 1000, wherein the physical game table 1000 encapsulates the user interface and the playing card shuffling assembly 1008, 404 for automatic dealing and more secure and comfortable game play desired by remote users 110*a-n*.

In one embodiment, the display screen 106 includes a player position 112*a-n* (or demarcation indicia) depicted on the user interface of the display screen 106, thereby conveying where every remote player participating in the game will be played during the game. Other indicia, such as betting areas, ante areas, may be utilized. As seen in FIG. 1, the plurality of remote users 110*a-n* each have an electronic communication device 114*a-n* (e.g., personal computer, phone, etc.) with a display 116 and that is communicatively coupled with the server 108 over a network 118. The communication may occur through known networking protocols.

More specifically, the gaming system architecture 100 depicted in FIG. 1 includes connections 126*a-n*, which are the medium used to provide communications links between various devices and computers connected together within the system 100. The connections 126*a-n* may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, the network 118 can include the Internet, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network 108 also may be implemented as a number of different types of networks, such as for example, an Intranet, a local area network (LAN), or a wide area network (WAN). FIG. 1 is intended as an example, and not as an architectural limitation for the present invention. The system 100 and/or the network 118 may include additional servers and other devices and entities not shown.

In one embodiment, the system 100 permits administrative user(s) 120 and remote users 110*a-n* (or their respective electronic devices 108, 114*a-n*) to conveniently, effectively, and safely (particularly in light of a pandemic) view and otherwise remotely interact with the game initiated by the playing users 110*a-n*. In preferred embodiments, each of the remote users 110*a-n* will register with the administrator through a software interface accessible on the users' electronic device 114*a-n* via a web-based platform or a downloadable software application resident on the user's electronic device. The electronic devices 114*a-n* illustrated in the block diagram are only exemplary implementations, but include a couplable display/user interface 116, along with a network interface, memory, a processing device, an audio input/output, and a location detection device.

The user input interface functions to provide a user a method of providing input to the electronic devices 114*a-n*, particularly for controlling actions during gameplay. The user input interface may also facilitate interaction between the user and the device. The user input interface may be a keypad providing a variety of user input operations. For example, the keypad may include alphanumeric keys for allowing entry of alphanumeric information (e.g., telephone numbers, contact information, text, etc.). The user input interface may include special function keys (e.g., a camera shutter button, volume control buttons, back buttons, home button, etc.), navigation and select keys, a pointing device, and the like. Keys, buttons, and/or keypads may be implemented as a touchscreen associated with the display. The touchscreen may also provide output or feedback to the user, such as haptic feedback or orientation adjustments of the keypad according to sensor signals received by motion detectors, such as an accelerometer, located within the device.

The network interfaces in the system 100 may include one or more network interface cards (NIC) or a network controller. In some embodiments, the network interface may include a personal area network (PAN) interface. The PAN interface may provide the capability for the electronic mobile device to network using a short-range communication protocol, for example, a Bluetooth communication protocol. The PAN interface may permit one electronic mobile device to connect wirelessly to another electronic device or the administrative server 108 via a peer-to-peer connection.

The network interfaces may also include a local area network (LAN) interface. The LAN interface may be, for example, an interface to a wireless LAN, such as a Wi-Fi network. In one embodiment, there is a wireless LAN that provides the electronic device with access to the Internet for receiving and sending inputs/messages to the server 108, over the Internet. The range of the LAN interface may generally exceed the range available via the PAN interface. Typically, a connection between two electronic devices via the LAN interface may involve communication through a network router or other intermediary device.

Additionally, the network interfaces may include the capability to connect to a wide area network (WAN) via a WAN interface. The WAN interface may permit a connection to a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including, but not limited to global systems for mobile communications (GSM), code division multiple access (CDMA), wideband CDMA (WCDMA), and the like.

Memory associated with the devices in the system may be, for example, one or more buffer, a flash memory, or non-volatile memory, such as random-access memory (RAM). The electronic devices may also include non-volatile storage. The non-volatile storage may represent any suitable storage medium, such as a hard disk drive or non-volatile memory, such as flash memory.

The processing device in the devices can be, for example, a central processing unit (CPU), a microcontroller, or a microprocessing device, including a "general purpose" microprocessing device or a special purpose microprocessing device. The processing device executes code stored in memory in order to carry out operation/instructions of the electronic devices or the display 106. The processing device may provide the processing capability to execute an operating system, run various applications, and provide processing for one or more of the techniques and process steps described herein.

The display on the remote users' devices 114*a-n* may be used to present various images, text, graphics, or videos to the user, such as live presentation of the physical cards being dealt by the administrative user 120 (either in-person manually and/or using electro-mechanical devices, such as a dealing shoe), the pot amount, and other information. The display may be any type of suitable display, such as a liquid-crystal display (LCD), a plasma display, a light-emitting diode (LED) display, or the like.

The electronic device may include audio input and output structures, such as a microphone for receiving audio signals from a user and/or a speaker for outputting audio data, such as audio alerts, songs, ringtones, video tracks, voice data received by the electronic device over a cellular network, and the like. The electronic devices may also include an audio port for connection to peripheral audio input and output structures, such as a headset, or peripheral speakers or microphones.

The location detection device may be associated with a global positioning system (GPS) or other location sensing technologies, thereby verifying the location of a remote user and reduce the likelihood of identity fraud, player verification, and/or other conduct prohibited within a playing protocol of a playing game. The electronic device may have a GPS receiver or the like, to determine the location of the electronic device when certain actions are made. Such GPS location information of the electronic device may be useful for certain features of embodiments of the present invention, such as, for example, locating remote users.

Figure 11:
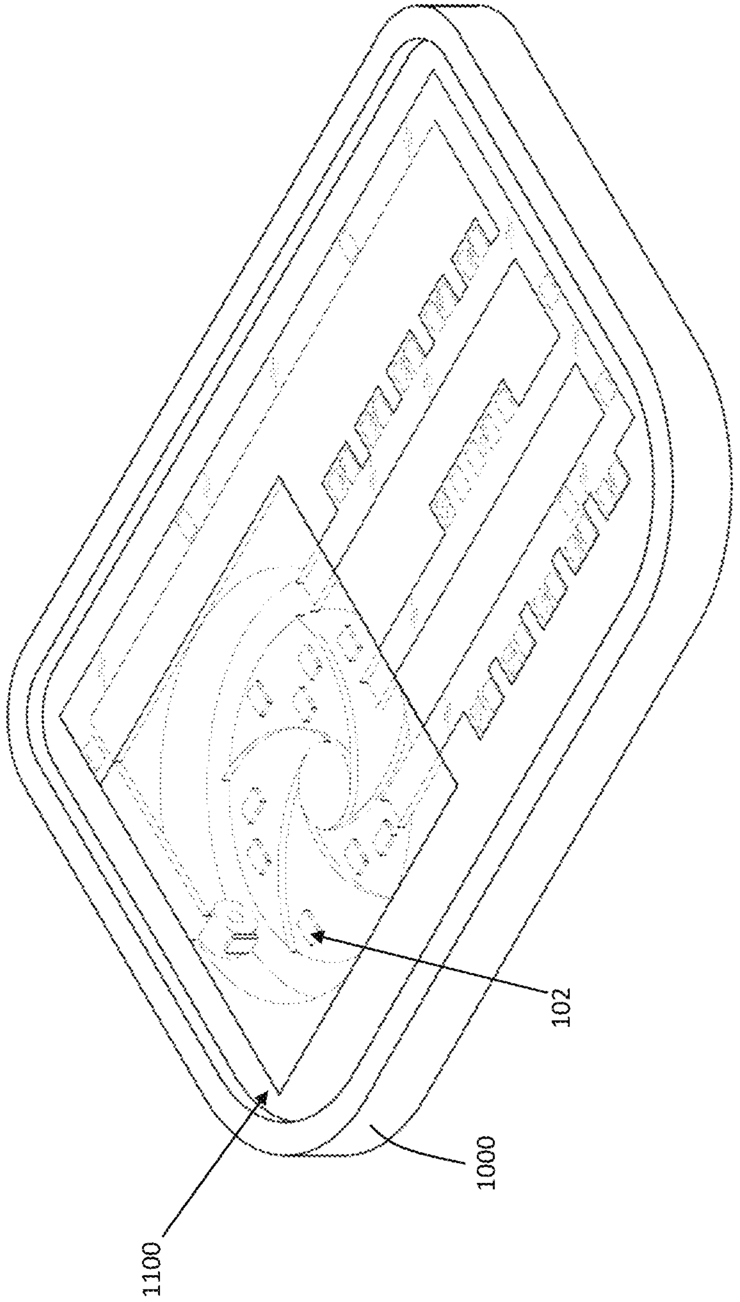
FIG. 11 depicts a perspective view of the physical table with the top screen coupled thereto in accordance with one embodiment of the present invention.

With specific reference to FIGS. 10-11, the physical game table 1000 includes a playing card shuffling assembly 1008 that may shuffle the playing cards 102 before or after dealing on the physical table, wherein step is depicted in the step 206 in the process flow diagram in FIG. 2. In one embodiment, the physical game table 1000 may include shuffling wheel to pull the playing cards 102 out of the shuffling pot. This can be seen in the partially sectional view of the physical game table 1000 in FIG. 10 and the perspective view in FIG. 11. As seen best in FIG. 10, the playing cards 102 may be moved down a sort of assembly line canal (illustrated by the black lines), passing through a RFID scanner 1010, until being placed on a player position or where the community cards would go. After the game being played is over (or cards are folded), the playing cards 102 go back on the canal and are then moved back to the shuffling pot 1002 to start the process over again. Similar technology and devices can be seen depicted and described in Blaha et al, U.S. Pat. No. 8,800,993, Kelly et al, U.S. Pat. No. 9,504,905, Stasson et al., U.S. Pat. No. 9,566,501, and Tseng, U.S. Pat. No. 9,919,203, the combination of which are incorporated herein by reference.

Said another way, with reference to FIGS. 1-2 and FIG. 10, the method may include providing a physical game table 104, 1000 with a physical playing card surface 128, 1004, communicatively couplable to a server 114*n* with a processor and a memory over a communications network 118, communicatively couplable with the plurality of electronic communication devices of the plurality of remote users 110*a-n* over the communications network 118, with a playing card shuffling assembly 1008 operably configured to randomize an order of the playing cards 102, and with at least one camera 122, 1006 coupled thereto and with a lens oriented toward the physical playing card surface 128, 1004 and a portion of the playing card shuffling assembly 1008. This unique and specialized configuration enables remote user confidence and effective and efficient remote game play desire by both gaming administrators and gaming users, a like. The process also includes communicatively coupling the physical game table 104, 1000 with the plurality of electronic communication devices 114*a-n* and initiating a playing card game with the plurality of remote users 110*a-n* having a player position depicted on the physical playing card surface 128, 1004 for each of the plurality of remote users 110*a-n*.

Next in the method of playing remote card game includes the step 208 of dealing at least one of the plurality of physical playing cards onto the display screen 106 by an administrative user 120 in a position on the display screen and the game table layout, and in a gaming method in accordance with the playing protocol associated with the playing card game initiated by the plurality of remote users 110*a-n*. For example, in Texas hold'em the user will first deal each of the remote users 110*a-n* face-down playing cards in or toward each of the respective positions 112*a-n*. The type of playing card is ascertained through one or more known methods such as cameras, RFID tags, etc., as described in Makhoul et al., U.S. Patent Application Publication No. 2010/0105460A1, Walker, U.S. Patent Application Publication No. 2009/0291762A1, Rafaeli, U.S. Pat. No. 6,755,741B1, and Gioia et al. (Gioia Systems, LLC), U.S. Pat. No. 7,591,728B2, the entirety of said references incorporated herein by reference. The one or more camera(s) 122 in the system 100 may also capture and enable display the actions of a live dealer 120. What remote users 110*a-n* will see as a display through the cameras will be control by the software application. Through the software application remote users will also be able to select their game decisions.

Said another way, the process includes dealing, after initiating the playing card game, a plurality of physical playing cards 102 onto a game table layout on the physical playing card surface 128, 1004 in accordance with a playing protocol associated with the initiated playing card game and with each player position having one of the physical playing cards proximal thereto (e.g., at a designated location demarcated on the game table layout or near, within 6 inches therefrom). In one embodiment, the process may include dealing the plurality of physical playing cards 102 onto the game table layout on the physical playing card surface 128, 1004 by a physical dealer or dealing user, wherein the final location for each of the dealt plurality of physical playing cards 102 onto the game table layout is guided by a laser light. This is beneficial because the dealing user dealing the playing cards 102 on a display screen 106 that operates a green screen may not know where the cards to be placed.

Further, the methodology may include dealing, after initiating the playing card game, a second plurality of physical playing cards 102 onto the game table layout on the physical playing card surface 128, 1004 for a second initiation of the playing card game in accordance with the playing protocol associated with the initiated playing card game and with each player position having one of the second plurality of physical playing cards proximal thereto. Said another way, a table 1000 will have multiple pairs of playing cards in front of or proximal to a player position on the table 1000 in order to maintain a good and consistent game flow (at a minimum two pairs; one pair being used to play the current game and a second pair being shuffled to play the following game).

As referenced above, an RFID or other RF device may be disposed on or otherwise operably coupled to the table 104 to scan or detect the type of playing card that is dealt (e.g., playing cards 102 will have identification chips embedded therein or coupled thereto). This will allow the software application to process the information in the same way digital card game software applications do (by converting the real card values into digital information).

Remote playing users will have the ability to share video of themselves just as if they were on a Facetime call or Zoom meeting with other players, thereby emulating an in-person playing environment. Through video and voice capabilities, all players in a particular game will have the ability to interact with other players and the dealer as if they were sitting at a live table inside a gaming establishment. The dealer may also have a television display in front of him or her that will show them what players see being displayed on the green screen table. The television display will also let the dealer know of any actions they need to take. The dealer will also have the ability to wear an earpiece, headphone, etc., in order to be able to communicate with the players. Vice-verse, the table 104 will have any necessary sound receptors so the players can hear the dealer. The software application or other software utilized by the remote users 110*a-n* will also have a chat function in players and dealers can communicate.

Next in the process may include step 210 of capturing video of the dealing at least one of the plurality of physical play cards onto the display screen 106 and the game table layout with at least one camera 122 and communicating the captured video of the dealing at least one of the plurality of physical play cards onto the display screen 106 and the game table layout to the electronic communication device 114*a-n* associated with the plurality of remote users 110*a-n*. Step 212 may include playing the playing card game initiated by the plurality of remote users 110*a-n* in accordance with the playing protocol to determine at least one winner. The process may terminate at step 214.

Said another way, the process may include capturing video of the dealing of the plurality of physical playing cards 102 onto the game table layout on the physical playing card surface 128, 1004 with the at least one camera in real-time and communicating the captured video of the dealing of the plurality of physical playing cards onto the display screen and the game table layout to the electronic display 116 for each of the plurality of electronic communication devices 114*a-n* for the plurality of remote users 110*a-n*. This unique and specialized methodology is desired by gaming establishments because it generates a trusted real life shuffling and dealing process of physical cards (as previously stated), wherein the live video feed is confirmation (or proof) that this is what is indeed happening (and to give players the feeling that they are playing at a physical gaming establishment). In another embodiment, the process includes capturing video of shuffling of the plurality of physical playing cards 102 by the playing card shuffling assembly 1008 in real-time with the at least one camera in real-time and communicating the captured video of the shuffling of the plurality of physical play cards to the electronic display 116 for each of the plurality of electronic communication devices 114*a-n* for the plurality of remote users 110*a-n*.

In another embodiment of the present invention, the method described above is played on a physical table in a remote style (i.e., without the players actually playing the game entirely on the table surface itself). Said another way, the method of playing a remote-like playing card game includes providing the least one deck of a plurality of physical playing cards 102 (as discussed above) and providing a plurality of electronic communication devices 114*a-n* of a plurality of users 110*a-n*, wherein the plurality of electronic communication devices 114*a-n* each have an electronic display (e.g., display 116). Further, the method includes providing a physical game table 104 with a physical playing card surface 106, with a playing card shuffling assembly 1008 operably configured to randomize an order of the playing cards 102 and, beneficially, have the plurality of electronic communication devices of the plurality of users coupled to the physical game table (e.g., physically attached with one or more fastener(s), couplable with a stand, or integrally incorporated into the game table). Additionally, the method includes at least one camera 122 coupled thereto and with a lens of the camera oriented toward the physical playing card surface 128 and, potentially, a portion of the playing card shuffling assembly 1008.

Additionally, the method includes communicatively coupling the at least one camera 122 with the plurality of electronic communication devices 114*a-n* over a communications network 118 so the users 110*a-n* can view what the camera(s) 122 are capturing and initiating a playing card game having the plurality of users 110*a-n* associated with a player position depicted on the physical playing card surface 128. Then, the process includes dealing, after the initiating of the playing card game, a plurality of physical playing cards (e.g., cards 124) onto a game table layout on the physical playing card surface in accordance with a playing protocol associated with the initiated playing card game and with each player position having one of the physical playing cards proximal thereto.

The process then includes capturing video of the dealing of the plurality of physical playing cards 124 onto the game table layout on the physical playing card surface 128 with the at least one camera 122 in real-time and communicating the captured video of the dealing of the plurality of physical playing cards onto the game table layout to the electronic display for each of the plurality of electronic communication devices of the plurality of users 110*a-m*. Lastly, the process includes playing the playing card game initiated by the plurality of users in accordance with the playing protocol to determine at least one winner therefrom.

Said another way, the process and devices enable the users, e.g., poker players, to sit around the table 104 without any living dealer needed. However, in the middle of the table, the players would be able to see (e.g., through a glass covering forming the surface 128 of the table 104) the machine shuffling and dealing of the cards, or other structures, such as dominos (which may also have the values of physical playing cards printed thereon). The domino tiles that may be distributed to the player positions on the surface 128 may also be processed using an RFID scanner that would identify the value of the tiles and deliver those values digitally to the player positions surrounding the table (thus preventing each player from seeing other players cards/values). At the end of each poker hand/game, the players would have the option to request for their cards/tiles to be flipped over and thus allowing the players to confirm that the values of the digital cards they were dealt were indeed the actual values of the tiles that were shuffled and dealt.

Figure 3:
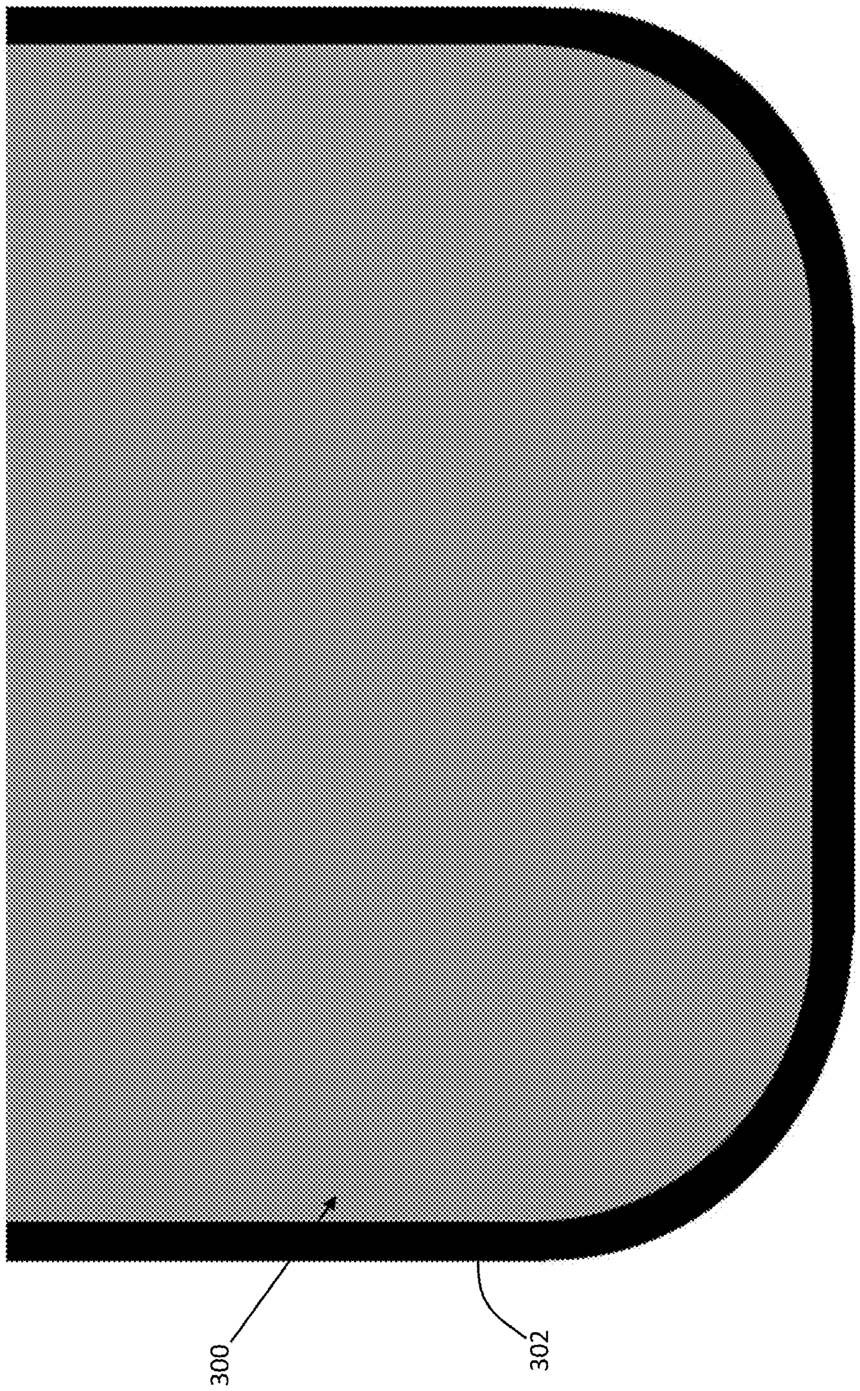
FIG. 3 depicts an illustration of a physical table tabletop with a green screen implemented to carry out the method of playing a remote playing card game in accordance with one embodiment of the present invention.

With reference to FIGS. 3-9, additional depictions exemplary game table layouts, user interfaces on the remote users' devices, and video screens for dealer viewing are depicted. More specifically, FIG. 3 depicts a physical electronic game table 300, e.g., a table with a tabletop green screen and a border rail 302 as previously described. The shape of the table advantageously includes an altered front that is wider on the corners than the traditional half circle blackjack table. This allows an image of both an oval shaped table game such as Texas Holdem and a half circle table game such as blackjack to fit onto a single universal table design.

Figure 5:
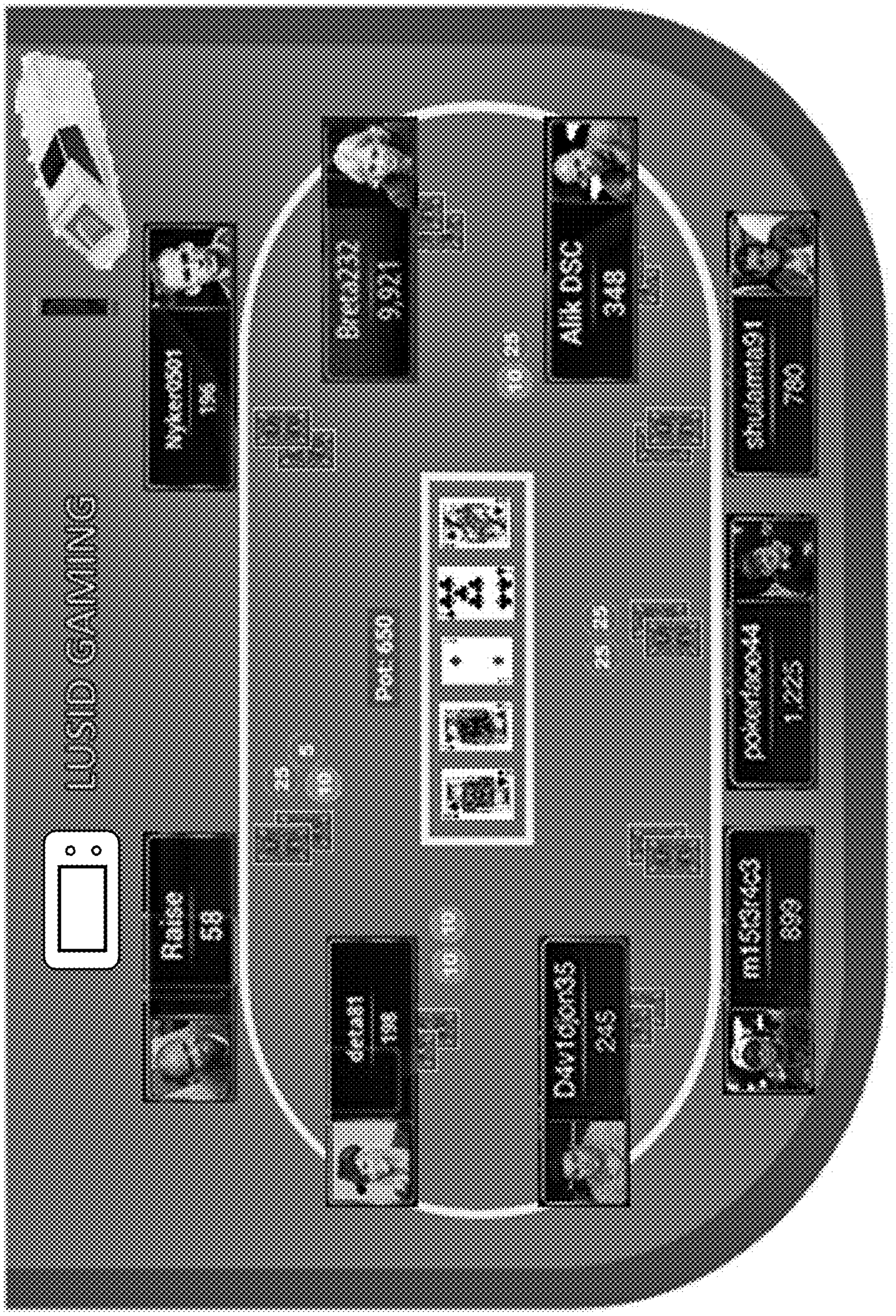
FIG. 5 depicts an illustration of the graphics and floating images that are configured to be added to the green screen during an exemplary Texas Holdem game implemented in accordance with one embodiment of the present invention and with floating images and graphics thereon.
Figure 6:
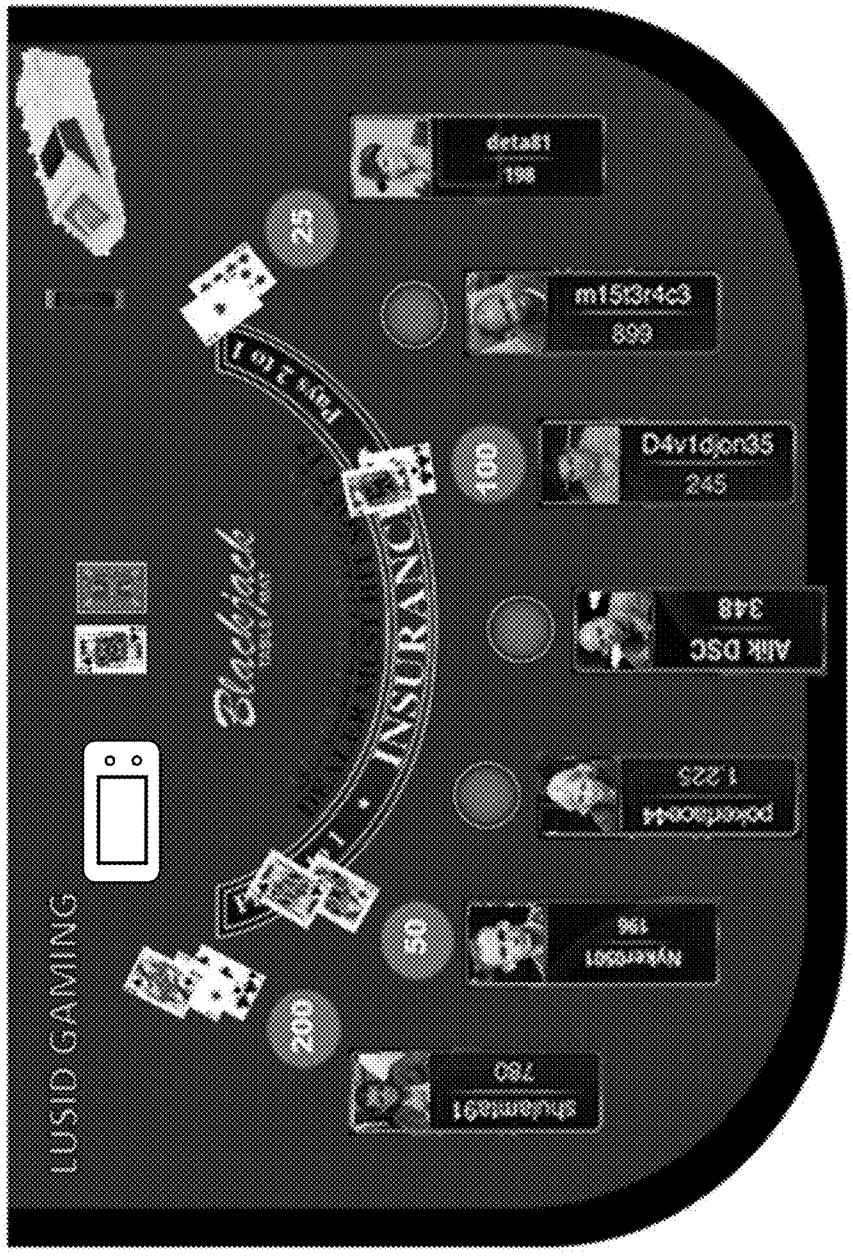
FIG. 6 depicts an illustration of the graphics and floating images that are configured to be added to the green screen during an exemplary Blackjack game implemented in accordance with one embodiment of the present invention.

FIG. 4 depicts an illustration of the green screen table with some of the real components (e.g., playing cards 124, shoe 400, etc.) that will go on the table. This view will be what the dealer or gaming establishment administrator may see. An RFID scanner 402 may be placed slightly to the left of the card shoe 400 to scan the cards as they come out of the shoe 400, thereby identifying what cards were dealt and then displaying a digital representation of said cards to the remote users. FIG. 4 depicts the upside-down player cards and upside community cards as they would be dealt if the game being played was Texas Hold'em. FIG. 5 depicts an illustration of the graphics and floating images that would be added to the green screen table if a game of Texas Hold'em was being played. This would be the image remote users would see of the table. FIG. 6 depicts same type of illustration as FIG. 5, but for a game of blackjack. Primary difference is the table color and felt image as well as the positioning of the remote player boxes. Also, this illustrates how easily the display can be changed to another game.

Figure 7:
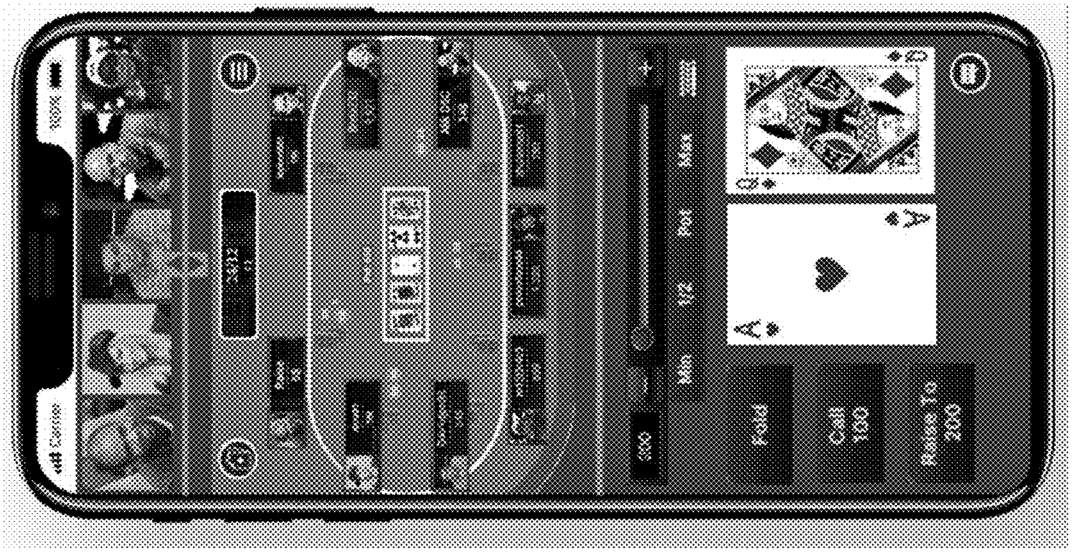
FIGS. 7-8 depict illustrations of playing card games implemented over a network of mobile communication devices in accordance with one embodiment of the present invention.
Figure 8:
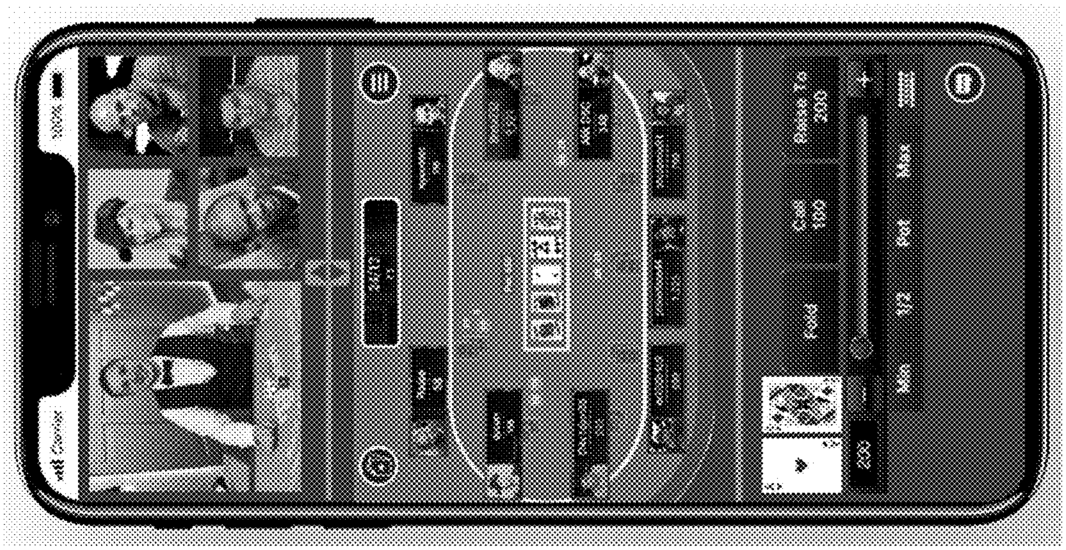
Figure 9:
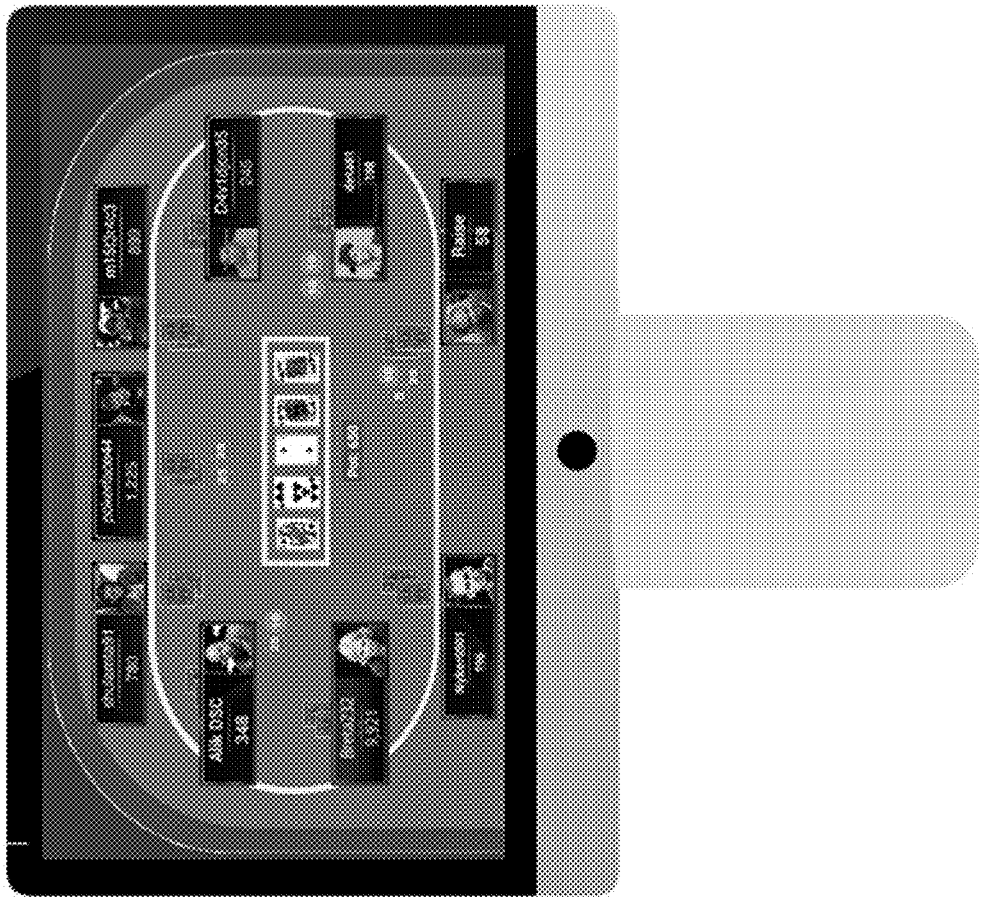
FIG. 9 depicts an electronic display or monitor placed at or near the physical table tabletop for viewing of remote players by a dealer in accordance with one embodiment of the present invention.

FIGS. 7-8 depict different designs of how an exemplary game would look on the mobile app of the remote players. Top section of the phone would be the video feed of the remote players and the casino dealer. The middle section is the video feed of the real cards on the physical table. The bottom section is where the players see their cards and make their game decisions. FIG. 9 depicts an electronic display or monitor that would allow the dealer to see the digital images created by the gaming application or software.

What is claimed is:

1. A method of playing a remote-like playing card game comprising the steps of:

providing at least one deck of a plurality of physical playing cards having four suits each having varying ranks of physical playing cards associated therewith;

providing a plurality of electronic communication devices of a plurality of users, the plurality of electronic communication devices each having an electronic display;

providing a physical game table with a physical playing card surface, with a playing card shuffling assembly operably configured to randomize an order of the playing cards, with the plurality of electronic communication devices of the plurality of users coupled to the physical game table, and with at least one camera coupled thereto and with a lens oriented toward the physical playing card surface and a portion of the playing card shuffling assembly;

communicatively coupling the at least one camera with the plurality of electronic communication devices over a communications network and initiating a playing card game having the plurality of users associated with a player position depicted on the physical playing card surface;

dealing, after the initiating of the playing card game, a plurality of physical playing cards onto a game table layout on the physical playing card surface in accordance with a playing protocol associated with the initiated playing card game and with each player position having one of the physical playing cards proximal thereto;

capturing video of the dealing of the plurality of physical playing cards onto the game table layout on the physical playing card surface with the at least one camera in real-time and communicating the captured video of the dealing of the plurality of physical playing cards onto the game table layout to the electronic display for each of the plurality of electronic communication devices of the plurality of users; and playing the playing card game initiated by the plurality of users in accordance with the playing protocol to determine at least one winner therefrom.

2. The method according to claim 1, wherein:

the lens is oriented toward a portion of the playing card shuffling assembly.

3. The method according to claim 1, wherein:

the physical game table is communicatively couplable to a server with a processor and a memory over a communications network and communicatively couplable with the plurality of electronic communication devices of the plurality of users over the communications network.

4. The method according to claim 1, further comprising:

providing an electronic display screen forming the physical playing card surface, the electronic display screen having a user interface depicting the player position for each of the plurality of users.

5. The method according to claim 4, further comprising:

providing a table screen forming an outer surface of the physical game table, the physical game table encapsulating the user interface and the playing card shuffling assembly.

6. The method according to claim 4, further comprising:

providing the server that is operably configured to execute computer-readable instructions to digitally vary the game table layout on the user interface based on the playing card game initiated.

7. The method according to claim 6, further comprising:

initiating the card game by the plurality of users, wherein the initiating of the playing card game by the plurality of users varies the game table layout on the user interface.

8. The method according to claim 4, further comprising:

dealing the plurality of physical playing cards onto the game table layout on the physical playing card surface by a dealer, the final location for each of the dealt plurality of physical playing cards onto the game table layout guided by a laser light.

9. The method according to claim 1, further comprising:

capturing video of shuffling of the plurality of physical playing cards by the playing card shuffling assembly in real-time with the at least one camera in real-time and communicating the captured video of the shuffling of the plurality of physical play cards to the electronic display for each of the plurality of electronic communication devices for the plurality of users.

10. The method according to claim 1, further comprising:

providing the at least one deck of the plurality of physical playing cards, each having at least one RFID tag coupled thereto and with a card identifier uniquely associated with one of the four suits and varying ranks; and receiving, from the card identifier from an RFID reader, each of the dealt plurality of physical playing cards onto the game table layout on the physical playing card surface and communicating the card identifier for each of the dealt plurality of physical playing cards onto the game layout on the physical playing card surface to the electronic display for each of the plurality of electronic communication devices for the plurality of users.

11. The method according to claim 1, further comprising:

dealing, after initiating the playing card game, a second plurality of physical playing cards onto the game table layout on the physical playing card surface for a second initiation of the playing card game in accordance with the playing protocol associated with the initiated playing card game and with each player position having one of the second plurality of physical playing cards proximal thereto.

12. A method of playing a remote-like playing card game comprising the steps of:

providing at least one deck of a plurality of physical playing cards having four suits each having varying ranks of physical playing cards associated therewith;

providing a plurality of electronic communication devices of a plurality of users, the plurality of electronic communication devices each having an electronic display;

providing a physical game table with a physical playing card surface, having the plurality of electronic communication devices coupled thereto, communicatively couplable to a server with a processor and a memory over a communications network, communicatively couplable with the plurality of electronic communication devices of the plurality of users over the communications network, with a playing card shuffling assembly operably configured to randomize an order of the playing cards, and with at least one camera coupled thereto and with a lens oriented toward the physical playing card surface and a portion of the playing card shuffling assembly;

communicatively coupling the physical game table with the plurality of electronic communication devices and initiating a playing card game with the plurality of users having a player position depicted on the physical playing card surface for each of the plurality of users;

dealing, after initiating the playing card game, a plurality of physical playing cards onto a game table layout on the physical playing card surface in accordance with a playing protocol associated with the initiated playing card game and with each player position having one of the physical playing cards proximal thereto;

capturing video of the dealing of the plurality of physical playing cards onto the game table layout on the physical playing card surface and video of shuffling of the plurality of physical playing cards by the playing card shuffling assembly with the at least one camera in real-time and communicating the captured video of the dealing of the plurality of physical playing cards onto the display screen, the game table layout, and the captured video of the shuffling of the plurality of physical play cards to the electronic display for each of the plurality of electronic communication devices for the plurality of users; and playing the playing card game initiated by the plurality of users in accordance with the playing protocol to determine at least one winner therefrom.

13. The method according to claim 12, further comprising:

providing an electronic display screen forming the physical playing card surface, the electronic display screen having a user interface depicting the player position for each of the plurality of remote users.

14. The method according to claim 12, further comprising:

dealing the plurality of physical playing cards onto the game table layout on the physical playing card surface by a dealer, the final location for each of the dealt plurality of physical playing cards onto the game table layout guided by a laser light.

15. The method according to claim 12, further comprising:

providing the at least one deck of the plurality of physical playing cards, each having at least one RFID tag coupled thereto and with a card identifier uniquely associated with one of the four suits and varying ranks; and receiving, from the card identifier from an RFID reader, each of the dealt plurality of physical playing cards onto the game table layout on the physical playing card surface and communicating the card identifier for each of the dealt plurality of physical playing cards onto the game layout on the physical playing card surface to the electronic display for each of the plurality of electronic communication devices for the plurality of remote users.

16. A method of playing a remote playing card game comprising the steps of:

providing at least one deck of a plurality of physical playing cards having four suits each having varying ranks of physical playing cards associated therewith;

providing a plurality of electronic communication devices of a plurality of remote users, the plurality of electronic communication devices each having an electronic display;

providing a physical game table with a physical playing card surface, with a playing card shuffling assembly operably configured to randomize an order of the playing cards, and with at least one camera coupled thereto and with a lens oriented toward the physical playing card surface;

communicatively coupling the at least one camera with the plurality of electronic communication devices and initiating a playing card game with the plurality of remote users and having the plurality of remote users associated with a player position depicted on the physical playing card surface;

dealing, after the initiating of the playing card game, a plurality of physical playing cards onto a game table layout on the physical playing card surface in accordance with a playing protocol associated with the initiated playing card game and with each player position having one of the physical playing cards proximal thereto;

capturing video of the dealing of the plurality of physical playing cards onto the game table layout on the physical playing card surface with the at least one camera in real-time and communicating the captured video of the dealing of the plurality of physical playing cards onto the game table layout to the electronic display for each of the plurality of electronic communication devices of the plurality of remote users; and playing the playing card game initiated by the plurality of remote users in accordance with the playing protocol to determine at least one winner therefrom.

17. The method according to claim 16, wherein:

the at least one camera has the lens oriented toward a portion of the playing card shuffling assembly.

* * * * *